United States Patent Office 3,621,860
Patented Nov. 23, 1971

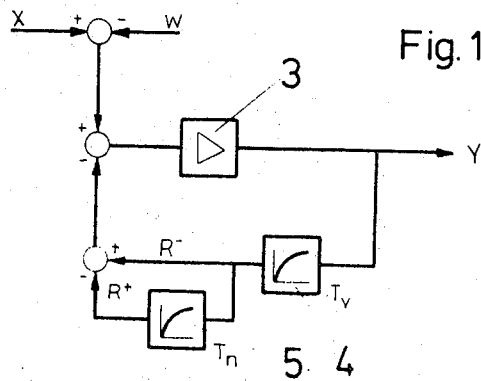
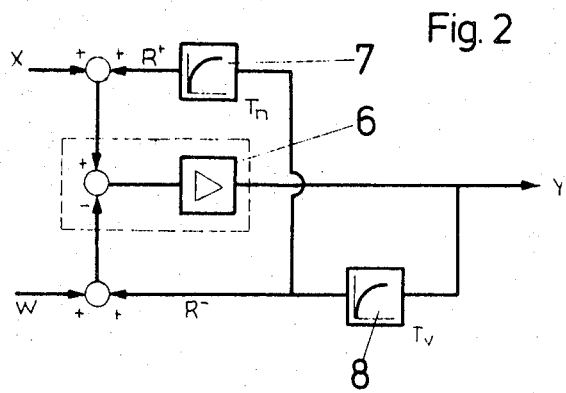
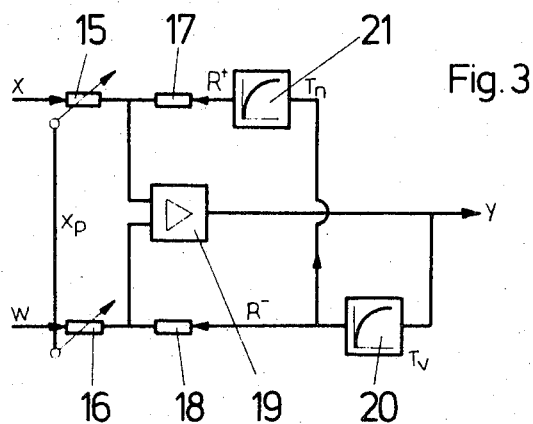

3,621,860
CONTROLLER ARRANGEMENT
Horst Bader, Stuttgart-Fasanenhof, Germany, assignor to
J. C. Eckardt AG., Stuttgart-Fasanenhof, Germany
Filed Oct. 3, 1969, Ser. No. 863,642
Claims priority, application Germany, Oct. 4, 1968,
P 18 01 240.3
Int. Cl. F15c 1/12, 3/04
U.S. Cl. 137—81.5                               16 Claims

ABSTRACT OF THE DISCLOSURE

A control system for PID-controllers (proportional-plus integral-plus differential controller) with feed back in which a first sum is produced from the "actual" value signal and the positive feedback signal and a second sum is produced from the "set" value signal and the negative feedback signal which serve as input signals of a differential pressure amplifier.

The present invention relates to a control arrangement for PID-controllers (proportional-plus integral-plus differential controllers or three-term controllers) with feedback consisting of at least one amplifier that produces an output signal dependent on the "set" value and on the "actual" value and on the lag-elements arranged in the feedback path, which output signal serves for the formation of a positive feedback and of a negative feedback signal.

Known control arrangements for pneumatic controllers include three summing points which are also called comparing points. The first summing point produces the difference between an actual value and a set value whereas the second summing point determines the difference between the two feedback signals $R^-$ and $R^+$. The negative feedback signal is thereby designated by $R^-$ and the positive feedback signal by $R^+$. Both signals $R^-$ and $R^+$ are pneumatic pressure magnitudes which are derived from the controller output signal. Finally, a third summing point is provided in these prior art devices which subtracts from the result of the first summing point, the result of the second summing point.

Thus, for example, with a known, prior art pneumatic PID-controller there is produced in a different pressure-measuring unit from the pressure magnitudes for the actual value $x$ and the set value $w$ a displacement that is proportional to the control deviation $(x-w)$. From this displacement magnitude is subtracted the displacement of a second differential pressure-measuring unit which is arranged in the feedback path of the controller and forms the difference between the negative and positive feedback signals.

The comparing or summing points are realized in the prior art control systems by means of mechanical comparing systems: The pneumatic pressures act pair-wise on mechanical systems or structures, such as floating rings (Foxboro), disks or levers whose displacements or strokes are converted by a flapper nozzle system into a pressure magnitude that is necessary for the control of the amplifier. These mechanical systems or structures are susceptible of and prone to vibrations and oscillations which affect disadvantageously the accuracy of the controller.

The present invention is concerned with the task of avoiding these disadvantages and creating a control arrangement for PID-controllers which makes it possible to realize the summing points by simple means.

The present invention is essentially characterized in that a first sum is formed from the actual value and positive feedback signal, and a second sum is formed from the set value and negative feedback signal which sums serve as the input signals of the amplifier constructed as the differential pressure amplifier.

The present invention is predicated on the recognition that the realization of the summing points in control circuits, i.e., the processing of the signals, can be obtained with simple structural elements if this task is conceived as a double addition of two each of the four signals and a subtraction whereby this summing point is included in the amplifier itself, i.e., the summing point or place of subtraction need no longer be realized in a mechanical structural part outside of or external to the amplifier. The addition may be realized without great structural expenditures with the aid of two resistances in that the terms of the sum are applied in the form of pneumatic pressures to these resistances, which form a pressure divider. Between these resistances, a signal is then established which is proportional to the sum of the two applied pressures. Since any mechanical summing or comparing system is dispensed with, vibration and oscillation problems no longer occur.

For the purpose of providing two summing means, only two pressure dividers are then necessary which may consist of two restrictors or needle valves and may be laid out as a pneumatic bridge. The differential pressure amplifier is then to be connected in the bridge diagonal.

It is thereby of advantage if the amplifier does not absorb any energy in the form of pressure air from the two pressure dividers. This can be readily realized with pneumatic controllers by means of conventional diaphragm-controlled differential pressure amplifiers whose input pressure spaces are closed off and whose output signal is fed by an auxiliary energy source. The amplifier then acts as energy-decoupling means between the input and output signals of the controllers.

The proportional band adjustment is to be achieved by a change of the resistance value of one or several of the restrictors or needle valves. If the two resistances of the bridge which are connected to the input signals $x$ and $w$, are adjusted in unison and in the same sense, then the output signal $y$ is proportional to the difference $x-w$. However, an adjustment is also possible which produces differential proportionality factors for $x$ and $w$ if the corresponding resistances are adjusted independently of one another.

These and further objects, features, and advantages of the present invention will become more obvious from the following description when taken in connection with the accompanying drawing which shows, for purposes of illustration only, two embodiments in accordance with the present invention and wherein:

FIG. 1 is a schematic diagram of a prior art control system for pneumatic controllers;

FIG. 2 is a schematic diagram for a control system according to the present invention; and FIG. 3 is a schematic diagram of a modified embodiment of the present invention illustrating the application of the control system according to FIG. 2 to pneumatic controllers.

Referring now to the drawing and more particularly to FIG. 1, this figure illustrates the conventional, prior art system on which are based the known pneumatic PID-controllers. At first, the control deviation ($x-w$) is formed by conventional means which is supplied to the second summing or comparison point directly ahead of the amplifier 3. In the feedback path, a further summing or comparison point is necessary which determines the difference between the negative and positive feedback signals. The lag elements 4 and 5 form the negative and positive feedback signals from the output signal $y$ of the controller.

FIG. 2 illustrates a control system for the PID-controller according to the present invention which utilizes also conventional elements. The input signals $x$ and $w$ are each added to a respective one of the two feedback signals $R^+$ and $R^-$. These sums serve as input signals of the differential pressure amplifier 6. The feedback signals are derived as is known by means of lag elements 7 and 8 of conventional construction from the controller output signal $y$.

FIG. 3 illustrates the control systm according to FIG. 2 for pneumatic PID-controllers. The pressure signals $x$, $w$ and the feedback signals $R^+$ and $R^-$ are connected to the resistances 15, 16, 17 and 18 of conventional construction, such as conventional restrictors or needle valves, of which the resistances 15 and 16 are adjustable in unison and in the same sense for the proportional band adjustment. One pressure signal each is obtained between the resistances 15, 17 and between the resistances 16, 18 of the two pressure dividers which is proportional to the sum of the connected pressures. This, however, is only the case if all pressure signals are produced by amplifiers which possess pressure controller characteristics, for example, non-bleed amplifiers or relays. These amplifiers maintain the existing pressure signal under air absorption or air discharge. An adulteration or error during the signal processing by energy coupling of the signals by way of the restrictors or needle valves is not to be expected in that case. The differential pressure amplifier 19 does not absorb any energy by way of the pressure dividers since an amplifier of any conventional construction, known as such, is provided whose input pressure spaces are delimited by elastic walls, for example, by diaphragms.

The lag elements 20 and 21 in the feedback path serve in a conventional manner for the production of the time characteristics of the controller.

The adjustment of the proportional band range $x_p$ is now achieved in that, for example, resistances 15 and 16 are adjusted in unison and in the same sense.

Thus, small proportional band ranges result if the resistances 15 and 16 have small values compared to the resistances 17 and 18. In that case, the input pressures $x$ and $w$ of the controller act on the differential pressure amplifier without large pressure drop by way of the resistances 15 and 16. A small difference between the input pressures $x$ and $w$ of the controller which is designated as control deviation $x_w$ then suffices for the control of the amplifier 19.

Large proportional band ranges are produced if the resistances 15 and 16 are adjusted or selected as large values in relation to the resistances 17 and 18.

As pointed out above, the various summing points, lag elements, and differential pressure amplifier as well as the means forming the flow resistances may be of conventional construction as known in the art.

While I have shown and described only two embodiments in accordance with the present invention, it is obvious that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A control system for PID-controllers comprising at least one differential pressure amplifier producing an output signal in dependence on a set value $w$ and on an actual value $x$, lag means responsive to said output signal for forming a positive feedback signal $R^+$ and a negative feedback signal $R^-$, summing means forming a first sum signal ($x+R^+$) from the actual value and the positive feedback signal and a second sum signal ($w+R^-$) from the set value and the negative feedback signal, and means for applying said first and second sum signals as input signals of said differential pressure amplifier.

2. A control system for pneumatic PID-controllers according to claim 1, characterized in that for purposes of energy-decoupling, the input pressure spaces of the differential pressure amplifier are delimited by elastic walls.

3. A control system for pneumatic PID-controllers according to claim 1, characterized in that the pressure signals of the actual value $x$, of the set value $w$, and of the amplifier output $y$ are produced by amplifier means with pressure control properties.

4. A control system for pneumatic PID-controllers according to claim 3, characterized in that said amplifier means with pressure control properties are non-bleed amplifier means.

5. A control system for pneumatic PID-controllers according to claim 3, characterized in that said amplifier means with pressure control properties are relays.

6. A control system for pneumatic PID-controllers according to claim 1, characterized in that the signal pressure difference for the control of the differential pressure amplifier is derived from pressure divider means which are formed by flow resistance means whereby the actual value pressure and positive feedback signal pressure are applied to the flow resistance means of the actual value divider means and the set value pressure and negative feedback signal pressure are applied to the resistance means of the set value pressure divider means.

7. A control system for pneumatic PID-controllers according to claim 6, characterized in that said flow resistance means are restrictors.

8. A control system for pneumatic PID-controllers according to claim 6, characterized in that said flow resistance means are needle valves.

9. A control system for pneumatic PID-controllers according to claim 6, characterized in that at least two resistance means that are associated with different pressure divider means are adjustable in unison and in the same sense for the adjustment of the proportional band.

10. A control system for pneumatic PID-controllers according to claim 9, characterized in that for purposes of energy-decoupling, the input pressure spaces of the differential pressure amplifier are delimited by elastic walls.

11. A control system for pneumatic PID-controllers according to claim 10, characterized in that the pressure signals of the actual value $x$, of the set value $w$, and of the amplifier output $y$ are produced by amplifier means with pressure control properties.

12. A control system for pneumatic PID-controllers according to claim 9, characterized in that said amplifier means with pressure control properties are non-bleed amplifier means.

13. A control system for pneumatic PID-controllers according to claim 9, characterized in that said amplifier means with pressure control properties are relays.

14. A control system for pneumatic PID-controllers according to claim 6, characterized in that at least one flow resistance means is adjustable for the adjustment of the proportional band.

15. A control system for pneumatic PID-controllers according to claim 14, characterized in that said one resistance means is adjustable continuously.

16. A control system for pneumatic PID-controllers according to claim 14, characterized in that said one resistance means is adjustable step-wise.

References Cited

UNITED STATES PATENTS

| | | | |
|---|---|---|---|
| 3,339,571 | 9/1967 | Hatch, Jr. | 137—81.5 |
| 3,380,465 | 4/1968 | Rona | 137—81.5 |
| 3,388,713 | 6/1968 | Bjornsen | 137—81.5 |
| 3,395,719 | 8/1968 | Boothe et al. | 137—81.5 X |
| 3,417,769 | 12/1968 | Bjornsen et al. | 137—81.5 |
| 3,429,248 | 2/1969 | Furlong | 137—81.5 X |
| 3,495,774 | 2/1970 | Haspert | 235—200 PF |

SAMUEL SCOTT, Primary Examiner